United States Patent [19]

Johnson et al.

[11] Patent Number: 4,728,951
[45] Date of Patent: Mar. 1, 1988

[54] VERTICAL WINDSHEAR DETECTION FOR AIRCRAFT

[75] Inventors: David A. Johnson; Terry L. Zweifel, both of Phoenix, Ariz.

[73] Assignee: Honeywell Inc., Minneapolis, Minn.

[21] Appl. No.: 835,446

[22] Filed: Feb. 28, 1986

Related U.S. Application Data

[63] Continuation-in-part of Ser. No. 787,879, Oct. 16, 1985, abandoned.

[51] Int. Cl.$^4$ .............................................. G08B 23/00
[52] U.S. Cl. .................................... 340/968; 73/178 T; 244/181; 244/182; 340/967; 364/434
[58] Field of Search ................ 340/945, 963, 966–971, 340/973, 974; 244/181, 182, 191; 73/178 R, 178 T; 364/427, 428, 434

[56] References Cited

U.S. PATENT DOCUMENTS

| | | | |
|---|---|---|---|
| 3,686,626 | 8/1972 | Bateman et al. | 340/971 |
| 3,691,356 | 9/1972 | Miller | 73/178 T |
| 3,839,699 | 10/1974 | Heinsohn et al. | 340/963 |
| 4,079,905 | 3/1978 | Greene | 340/968 |
| 4,110,605 | 8/1978 | Miller | 73/178 T |
| 4,121,287 | 10/1978 | Leal et al. | 340/970 |
| 4,229,725 | 10/1980 | Reilly | 340/968 |
| 4,261,537 | 4/1981 | Tisdale, Sr. et al. | 364/434 |
| 4,281,383 | 7/1981 | Lebrun | 340/968 |
| 4,319,219 | 3/1982 | Rein-Weston | 364/428 |
| 4,551,723 | 11/1985 | Paterson | 340/946 |
| 4,586,140 | 4/1986 | Millen | 340/968 |
| 4,593,285 | 6/1986 | Miller et al. | 340/968 |

OTHER PUBLICATIONS

"Windshear Escape", Transport Press, Jul. 6, 1985.

Primary Examiner—James L. Rowland
Assistant Examiner—Brent A. Swarthout
Attorney, Agent, or Firm—Arnold L. Albin

[57] ABSTRACT

The invention provides for rapid response and reliable detection of vertical windshear during the takeoff and approach phases of flight. Standard instrumentation available on many aircraft is used to calculate the down-draft acceleration and its effect on the aircraft's performance capability. The invention utilizes inputs from vertical acceleration, true airspeed, pitch angle, and angle of attack sensors. The rate of change of vertical wind is derived from the sensed signals and used to determine the margin between the aircraft's present performance capability and the predicted performance capability at stick shaker speed. By incrementing a timer when the down-draft acceleration is above a predetermined level, and comparing this time to the predicted time for the aircraft to decelerate to stick shaker speed based on the present windshear acceleration, a variable threshold of detection is obtained, which provides a more immediate detection of windshear than where a fixed threshold of detection is provided, with fewer incidences of false alarms.

10 Claims, 4 Drawing Figures

VERTICAL WINDSHEAR DETECTION FOR AIRCRAFT

BACKGROUND OF THE INVENTION

This application is a continuation-in-part of application Ser. No. 787,879, filed Oct. 16, 1985, now abandoned.

1. Field of the Invention

The present invention relates to aircraft instruments, and more particularly to a system for the detection of vertical windshear encounters during the takeoff and approach phases of flight utilizing a variable threshold of detection for annunciating the windshear condition.

2. Description of the Prior Art

Windshear encounters are a prime concern of the aircraft industry owing to the numerous accidents directly attributable to the phenomeon. Windshear may be defined as a sudden change in magnitude or direction of the wind, this being a difference between an air mass reference proximate to the aircraft and an inertial or ground-base reference, and more specifically, a change in vertical windshear for this invention.

A number of attempts and proposals have been made in the past to provide the pilot of an aircraft during a takeoff phase or landing approach with a warning of impending windshear conditions. Most of these have involved some means for detecting changes in ground speed as by using a ground based reference such as distance measuring equipment (DME) or by using an airspeed transducer and measuring the rate of change of its output, augmented by longitudinal acceleration to provide an inertial component related to the earth. Still other proposals have added vertical accelerometers to provide measures of craft vertical motion produced by the effects of windshear or utilized an input in accordance with the downdrift angle of the aircraft from the desired flight path.

One significant disadvantage of prior art windshear detectors that utilize indicated airspeed (IAS) or calibrated airspeed (CAS) is that they fail to correct for changes in density of the air mass with temperature and altitude, resulting in significant errors in wind rate measurement.

It is important that the detection of windshear be done as quickly and reliably as possible while eliminating nuisance annuciations. Prior art windshear detection systems utilized a fixed, predetermined threshold of wind change necessary for annuciating a windshear condition. The shortcoming of this design philosophy is that some hazardous vertical windshears may not be detected, while some annunciations or windshear may not be due to encountering a hazardous condition. The present invention utilizes a variable threshold controlled by the magnitude of the windshear. Also, the time required for detection of windshear in prior art systems as not as fast as the present invention due to the necessarily high threshold level required to prevent nuisance annunciations.

SUMMARY OF THE INVENTION

The present invention provides for the rapid and reliable detection of vertical windshear during the takeoff and approach phases of flight. Standard instrumentation available on most aircraft is used to sense and calculate the down draft acceleration and its effect on the aircraft's remaining performance capability. The present invention utilizes vertical acceleration, true airspeed, pitch angle, and angle of attack sensors. The rate of change of vertical wind (down draft acceleration) is used to determine the margin between the aircraft's present performance capability and the performance capability at stick shaker speed (minimum safe speed), with power-to-weight ratio as the performance criterion. By incrementing a timer when the down draft acceleration is above a predetermined level, and comparing this to the predicted time required to reach minimum performance capability based on the present wind acceleration, a real-time detection of windshear is provided.

In its most general form, the invention provides a windshear detection apparatus for aircraft and comprises means for providing a signal corresponding to the magnitude of a windshear, means responsive to the windshear signal for providing a signal that is representative of the time duration of the windshear, and means for combining the windshear magnitude and duration signals to provide an indication that the magnitude and duration have exceeded predetermined limits.

In a preferred embodiment, the invention comprises means for providing a signal representative of true airspeed, means for providing a signal representative of pitch angle of the aircraft, means for providing a signal representative of angle of attack of the aircraft, means for providing a signal representative of vertical acceleration of the aircraft, means for combining the pitch angle signal and the angle of attack signal to provide a signal representative of flight path angle, means for deriving a signal representative of the rate of change of airspeed from the true airspeed signal, means responsive to the airspeed rate signal and the flight path angle signal for deriving a product signal thereof, means responsive to the pitch angle signal and the angle of attack signal for deriving a signal representative of the rate of change of flight path angle, means responsive to the true airspeed signal and the rate of change of flight path angle signal for deriving a further product signal, means responsive to the above mentioned product signals for providing a further combined signal representative of vertical acceleration relative to an airmass proximate to the aircraft, means for algebraically subtracting the further combined signal from the vertical acceleration rate signal to provide a signal representative of a vertical component of the windshear, means responsive to the signal representative of a vertical component of windshear for providing a first timing signal representative of a magnitude of the vertical component of windshear, means for providing a signal representative of a predetermined value of an aircraft parameter, means responsive to the aircraft parameter signal and the vertical component of windshear signal for generating a second timing signal representative thereof, and means for algebraically subtracting the second timing signal from the first timing signal to generate a control signal indicative of the detection of a vertical windshear condition.

DESCRIPTION OF THE PREFERRED EMBODIMENTS

Figure 1:
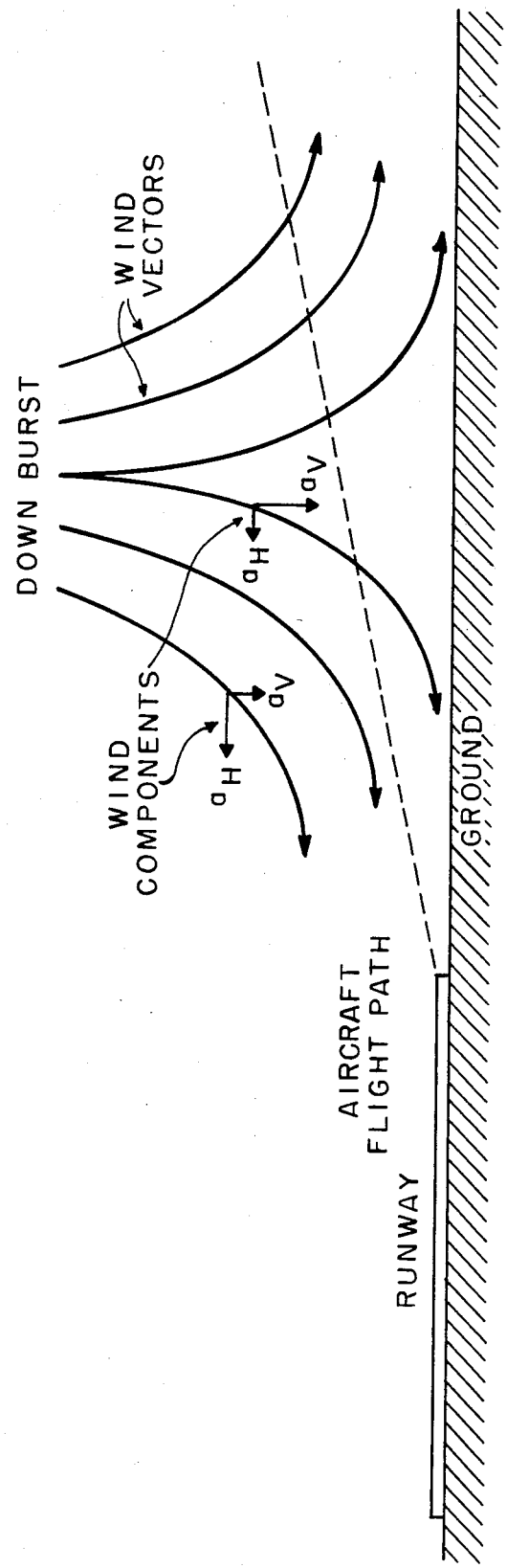
FIG. 1 illustrates a representative down-burst/windshear envelope relative to the runway and flight path of the aircraft, showing the horizontal and vertical wind components at several points.

The most dangerous type of windshear is termed a "down burst" and will be encountered at low altitudes during the aircraft's takeoff and approach phases of flight, when the aircraft is most susceptible to the situation. FIG. 1 illustrates a typical down burst relative to the flight path of an aircraft and runway. The horizontal and vertical wind components $A_V$ and $A_H$, are illustrated at several points. Note that near the center of the down burst the wind will be almost totally vertical. An onboard computer can be used in the detection of windshear conditions by monitoring of certain measured sensor parameters. Once a windshear condition is detected, the pilot can be alerted to this fact, so that appropriate meaures can be taken to fly the aircraft to safety.

It is desirous to minimize or eliminate nuisance or false warnings of windshear to the flight crew. The important aspects of windshear are both the magnitude and duration of the shear. For example, common turbulence may create a change in wind speed sufficient to cause large excursions in aircraft true airspeed. But the duration of the change is so short as to pose no serious threat to safety of flight. Conversely, windshear can not only cause large airspeed excursions but can endure sufficiently long enough to endanger the aircraft. Hence, an important part of windshear detection is consideration of both the magnitude and length of time of the windshear.

Figure 2:
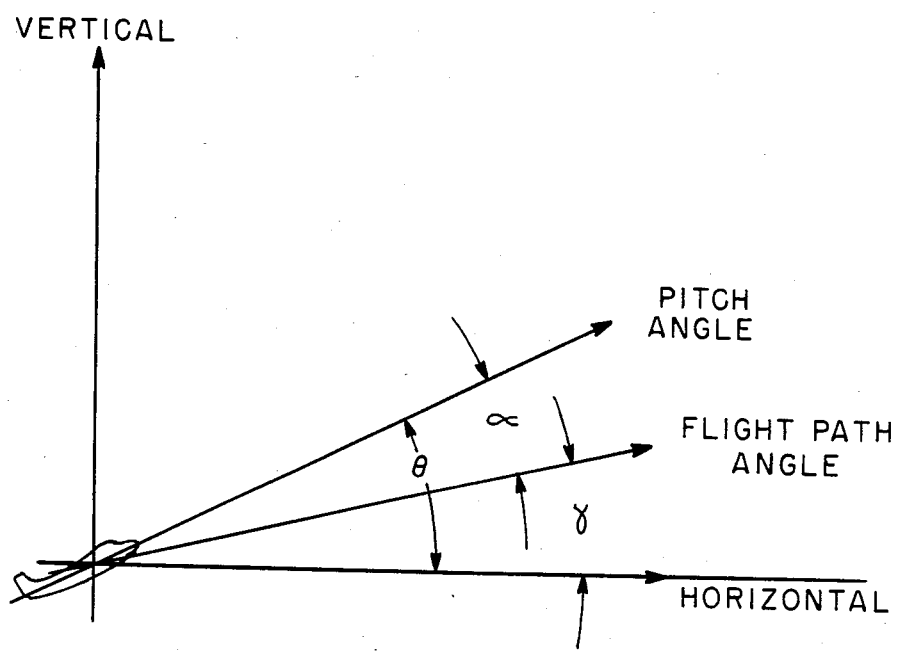
FIG. 2 illustrates the formal definitions of: pitch angle ($\theta$), flight path angle ($\delta$), and angle of attack ($\alpha$).

The rate of change of vertical windshear can be measured by using the well known definition of flight path angle $\gamma$:

$$\gamma = \theta - \alpha \qquad (1)$$

where $\theta$ is the pitch attitude of the aircraft and $\alpha$ the angle of attack relative to the air mass. FIG. 2 illustrates the relationship between $\alpha$, $\gamma$ and $\theta$. The angle marked "$\theta$" represents the pitch of the aircraft; the angle marked "$\alpha$" represents the angle of attack of the aircraft; and the angle marked "$\gamma$" indicates the flight path angle or climb gradient of the aircraft. Another definition of flight path angle is the well-known relationship:

$$\gamma = \sin^{-1}(\dot{h}/V_T) \qquad (2)$$

where $\dot{h}$ is the vertical velocity of the aircraft (rate of climb) measured relative to the air mass and $V_T$ is the true airspeed. The angle of attack in normal landing situations would be less than 150. Using the trigonometric approximation valid for small angles, that the sine of an angle is equal to the angle itself measured in radians, and equating equations (1) and (2):

$$\theta - \alpha = \dot{h}/V_T \qquad (3)$$

Solving for $\dot{h}$ and taking the derivative with respect to time, where $\dot{h}$ is used interchangably for dh/dt, $\dot{V}_T$ for dv/dt, etc.:

$$\ddot{h}_{AIR} = V_T d/dt(\theta - \alpha) + (\theta - \alpha)d/dt V_T \qquad (4)$$

where $\ddot{h}_{AIR}$ is the vertical acceleration of the aircraft relative to the air mass. Then the vertical windshear rate can be determined from the following:

$$\ddot{h}_{WIND} = \ddot{h}_{GROUND} - \ddot{h}_{AIR} \qquad (5)$$

where $\ddot{h}_{GROUND}$ is the reading from a sensor such as an accelerometer mounted aboard the aircraft, corrected for roll and pitch attitudes, and $\ddot{h}_{AIR}$ is computed from equation (4), using inputs from conventional sensors.

As the aircraft enters a vertical windshear, it will experience a vertical wind rate (down draft acceleration) $\ddot{h}_{WIND}$, determined by equation (5). The effect of a vertical wind rate is to reduce the potential power-to-weight ratio of the aircraft relative to the air mass, which represents a loss of available energy. The power-to-weight ratio (P/W) is defined as the difference between the thrust and drag of the airplane, divided by the weight of the aircraft, the quotient multiplied by the true airspeed of the aircraft:

$$V_T(T-D)/W = \text{Power-to-Weight Ratio} = P/W \qquad (6)$$

The minimum allowable power-to-weight ratio (P/W) for safe flight for an aircraft with maximum thrust occurs at stick shaker speed. Hence, the change of altitude rate between the potential and minimum potential Power-to-Weight ratios can be expressed as:

$$V_T(T-D)/W - V_{SS}(T-D)/W = \dot{h} - \dot{h}_{SS} \qquad (7)$$

The left side of the equation is merely the difference in power-to-weight ratios, $\Delta P/W$, while the right side is the difference in rates of climb between the two states with zero longitudinal acceleration:

$$\Delta P/W = \Delta \dot{h} \qquad (8)$$

The time $t_T$ required to transition between the two states $$t_T = \Delta \dot{h}/\ddot{h} \qquad (9)$$

Hence, a measure of the time required to reduce the aircraft's power-to-weight ratio to the minimum allowable is defined by equation (10):

$$t_T = \Delta P/W/\ddot{h}_{WIND} \qquad (10)$$

The value of $t_T$ gives a measure of the time the current rate of vertical velocity can be sustained before reaching the minimum potential power-to-weight ratio at the measured vertical acceleration $\ddot{h}$. Thus $t_T$ can be used as a predictive measure of the amount of time a vertical wind rate can be sustained and allows more immediate detection of a vertical wind than the wind magnitude itself.

The determination of the aircraft's remaining performance capability, $\Delta P/W$, is derived using the classic aircraft performance equation:

$$V(T-D)/\dot{W} = V\dot{V}/g + \dot{h} \qquad (11)$$

where:
V = True Airspeed (ft/sec)
T = Engine Total Thrust (pounds)
D = Aircraft Total Drag (pounds)
g = Gravitational Constant (ft/sec$^2$)

$\dot{h}$=Vertical Speed (ft/sec)
W=Weight of Aircraft (pounds)
$\dot{V}$=Rate of change of True Airspeed (ft/sec$^2$)
In a vertical windshear only (no horizontal shear)

$$V(T-D)/W=\dot{h} \quad (12)$$

If full thrust is used in equation (12) the left side will define the present potential power-to-weight ratio. The minimum allowable power-to-weight ratio occurs at stick shaker (SS) speed.

$$V_{SS}(T-D)/W=\dot{h}_{SS} \quad (13)$$

Subtracting equation (13) from (12) gives the change in altitude rate between the present aircraft condition and the rate at stick shaker speed:

$$V(T-D)/W - V_{SS}(T-D)/W = \dot{h} - \dot{h}_{SS} \quad (14)$$

The left side of equation (14) is the difference in power-to-weight ratio $\Delta P/W$ while the right side is the difference in climb capabilities $\Delta \dot{h}$. Therefore:

$$\Delta P/W = \Delta \dot{h} \quad (15)$$

The transition time required between the climb capability with the present power-to-weight ratio and the climb capability at the minimum power-to-weight ratio will depend on the vertical acceleration caused by the windshear. Thus, $$t_T = \Delta \dot{h}/\ddot{h}_{WIND} \quad (16)$$

where $\ddot{h}_{WIND}$ is vertical acceleration due to windshear. Substituting equation (15) into (16) gives:

$$t_T = (\Delta P/W)\ddot{h}_{WIND} \quad (17)$$

As takeoff and landings are made at approximately constant speeds, the ratio $\Delta P/W$ can be assumed to be a constant. Selecting the minimum $\Delta P/W$ ratio will give the most conservative configuration. Using, for example, a minimum $\Delta P/W$ ratio of 0.237 g-seconds, which is approximate for a Boeing 737 aircraft, $$t_T = |0.237/\ddot{h}_{WIND}| \quad (18)$$

The value of $t_T$ gives a measure of the time the current rate of vertical wind can be sustained before reaching the minimum allowable power-to-weight ratio and is thus a measure of the severity of the shear.

The present invention may be implemented by using conventional analog circuitry and computation techniques or by using conventional wholly digital techniques, or by a combination of conventional hybrid digital-analog techniques. For example, summation devices, multipliers, dividers, and amplifiers may be implemented by operational amplifiers appropriately configured, while logic and mathematical functions may be implemented in a digital computer or the hardware equivalent. Since the functional units represented by the various blocks may be any one of the numerous devices for each respective function well-known in the art, it is considered unnecessary to show circuit detail. For clarity and understanding of the invention, a generally analog format will be shown, it being understood that the same analog format may also represent the programming of a programmable digital computer wherein the various analog inputs are converted to digital signals for digital processing and the various digital outputs are converted to analog signals.

Figure 3:
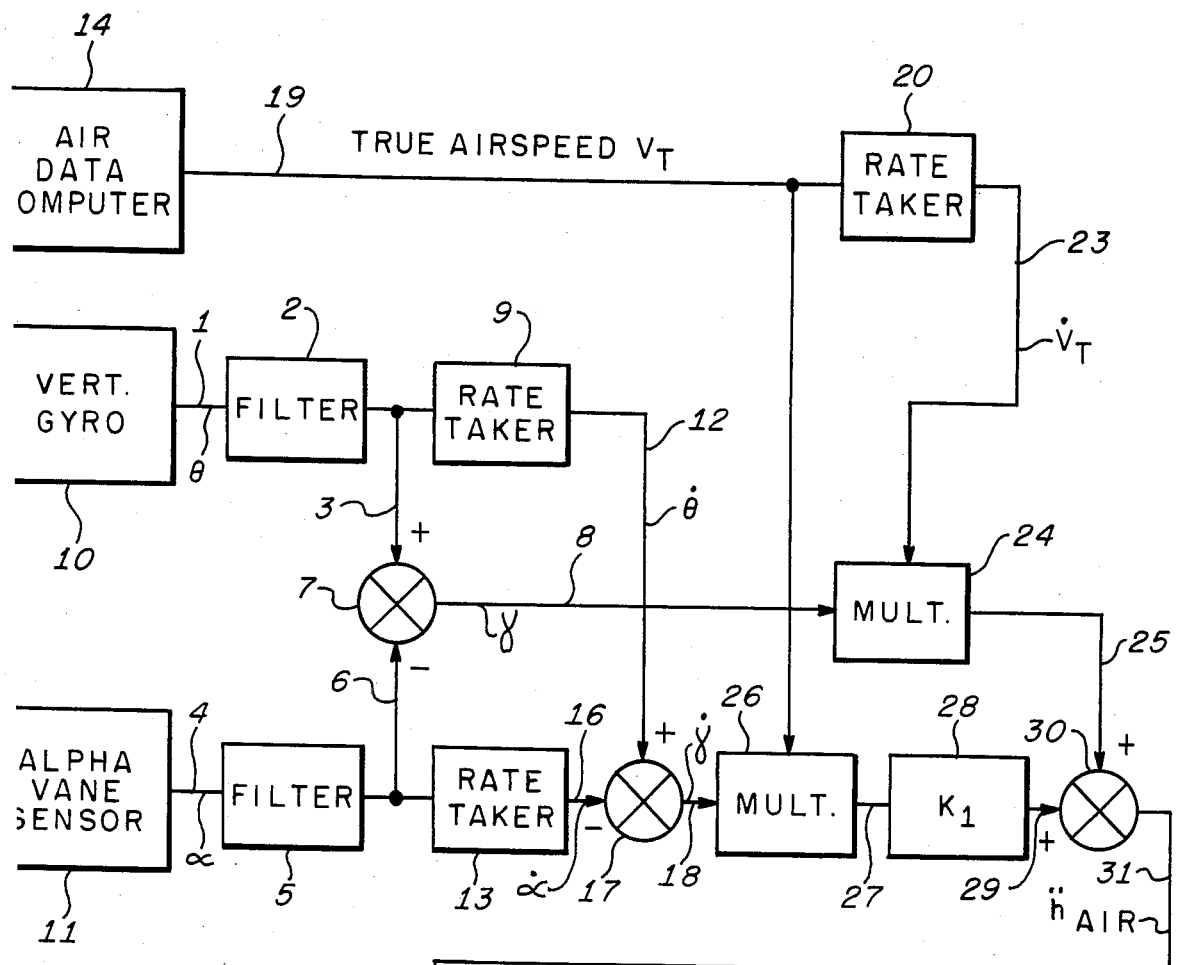
FIG. 3 is a block diagram illustrating the implementation of the windshear detection scheme of the present invention.
Figure 3:
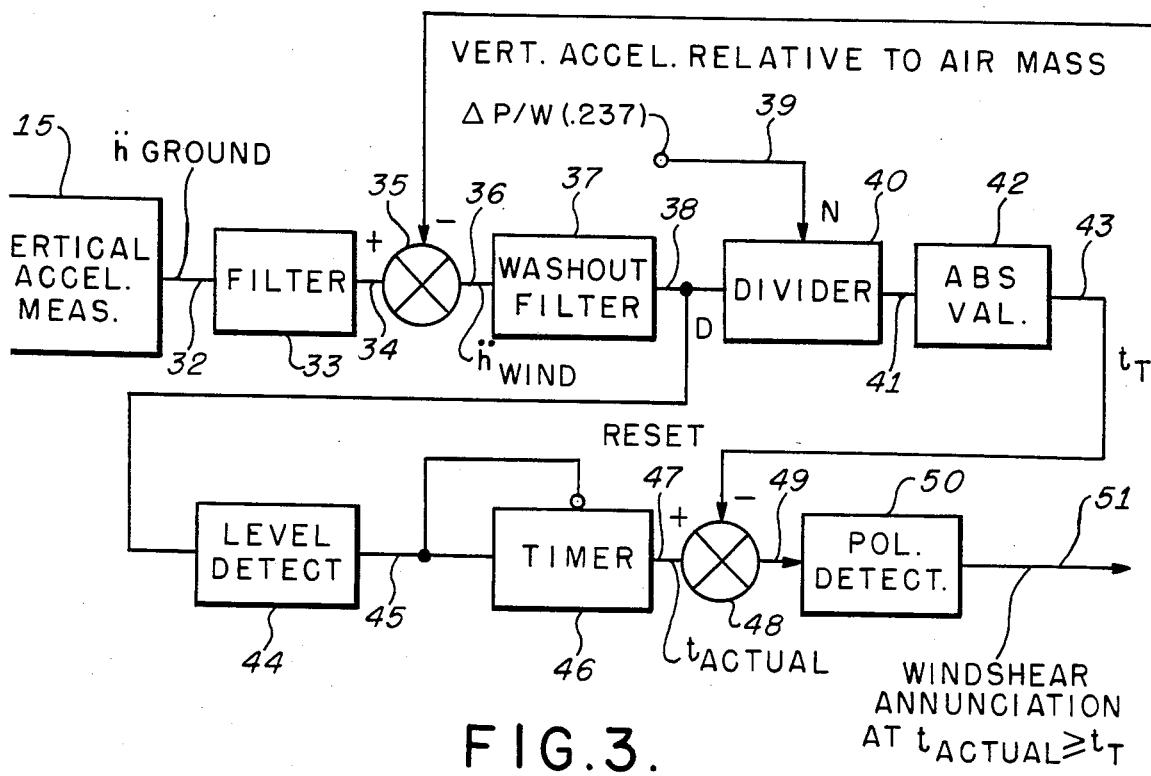

FIG. 3 illustrates the implementation in block diagram form of the detection scheme. Conventional air data computer 14 provides an output representative of the true airspeed $V_T$ from an airspeed transducer normally available on the aircraft. Rate taker 20 provides an output $\dot{V}_T$ on line 23 representing the rate of change in the instantaneous airspeed of the aircraft, and may be obtained by differentiating the signal output from computer 14. A pitch angle measurement ($\theta$) is obtained from a suitable sensor 10, such as a vertical gyro and supplied on lead 1 to filter 2. Filter 2 provides an output on lead 3 which is the pitch angle ($\theta$) filtered to remove high frequency noise. An angle of attack signal ($\alpha$) may be obtained from a conventional vane sensor 11 and is suppllied on lead 4 to filter 5. The output of filter 5 is supplied to lead 6 to provide an angle of attack signal filtered for high frequency noise. The signal on lead 6 is algebraically subtracted from the signal on lead 3 through conventional summing junction 7 to provide a derived flight path angle signal ($\gamma$) on lead 8, preferably scaled in radians. A signal representative of the rate of change of pitch ($\dot{\theta}$) is provided on line 12 and may be derived from filtered pitch angle on lead 3 by rate taker 9 through differentiating the pitch angle signal. The filtered angle of attack signal on lead 6 is also coupled to rate taker 13 for providing a rate signal ($\dot{\alpha}$) on lead 16 proportional to the true angle of attack rate. The angle of attack rate signal ($\dot{\alpha}$) on lead 16 is subtracted from the pitch rate signal ($\dot{\theta}$) on lead 12 using conventional summation device 17 to give flight path angle rate ($\dot{\gamma}$) on lead 18 in radians/second. True airspeed ($V_T$) from air data computer 14 is supplied on lead 19 and coupled through rate taker 20 to get a true airspeed rate signal ($\dot{V}_T$) which may be scaled in gravitational units (g=32 ft/sec/sec) on lead 23. True airspeed rate on lead 23 and flight path angle on lead 8 are multiplied using conventional multiplier 24 to derive a product thereof $\gamma \dot{V}_T$ on lead 25. The flight path angle rate signal ($\dot{\gamma}$) on lead 18 is multiplied by the true airspeed signal ($V_T$) on lead 19 using conventional multiplier 26 to give a further product signal on lead 27. Gain 28 ($K_1$) receives the product signal on lead 27 and normalizes the value from knots/second to "g's" giving normalized $\gamma \dot{V}_T$ on lead 29. The signals on lead 25 and lead 29 are thereupon added through conventional summing device 30. From equation (1) and (5), this yields the vertical acceleration $\ddot{h}_{AIR}$ relative to the air mass on lead 31. As will be shown, the vertical acceleration signal will be used to provide a variable windshear detection threshold operative whenever the vertical component of windshear exceeds a predetermined magnitude.

Referring to equation (5) it is clear that a vertical acceleration measurement which is the inertial acceleration $\ddot{h}_{GROUND}$ may be obtained from an accelerometer 15 corrected for roll and pitch attitudes of the aircraft, as supplied on lead 32. The acceleration signal on lead 32 is impressed on filter 33 to produce a vertical acceleration signal filtered to remove high frequency noise on lead 34. The acceleration signal on lead 31 is subtracted from the vertical acceleration signal $\ddot{h}_{AIR}$ on lead 34 using conventional algebraic summation device 35 to provide a difference signal representative of the vertical windshear rate $\ddot{h}_{WIND}$ on lead 36. The signal on lead 36 is passed through washout circuit 37 which may comprise a lead-lag filter, to remove any accelerometer offset or bias, giving band-pass filtered vertical windshear acceleration on lead 38. This signal is coupled to divider 40 which is also provided with a reference signal $\Delta P/W$ at terminal 39. The power-to-weight ratio margin, $\Delta P/W$, for example 0.237 for a Boeing type 737-200 aircraft, is supplied on lead 39, and may be obtained from a suitable digital memory. The signal on lead 39 is divided by the signal on lead 38 using conventional divider 40 to give a value of $0.237/\ddot{h}_{WIND}$ on lead 41, which is known from equation (17) to be the signal $t_T$. Since the value of time $t_T$ must always be positive, the absolute value of signal 41 is taken using absolute value taker 42 to supply signal $t_T$ on lead 43. Signal 38 is coupled to level detector 44, which detects level above and below a given acceleration level on lead 38 (for example $+/-0.02$ g). If these levels are exceeded, a logical 1 will appear on lead 45; otherwise, a logical 0 will be on lead 45. The signal at lead 45 is coupled to elapsed time generator 46 which provides when activated a signal indicative of the actual duration of the windshear condition, $t_{ACTUAL}$ on lead 47, which is then applied to summing junction 48. If lead 45 has a logical 1 then timer 46 will be incremented, and if lead 45 has a logical 0 then timer 46 will be reset. Time $t_T$ on lead 43 is subtracted from actual time on lead 47 using conventional algebraic summation device 48 and is impresed on lead 49. The output on lead 49 is indicative of the presence and duration of a vertical component of windshear which exceeds a predetermined value. The signal on lead 49 is applied to a polarity detector 50 which operates in such a manner that a logical 1 will be impressed on lead 51 if the actual time signal on lead 47 equals or exceeds the computed time signal appearing on lead 43. If a logical 1 appears on lead 51 a windshear annunciation signal will be turned on, and if lead 51 is a logical 0 the annunciation signal will be reset to zero. This signal may be used to activate a visible and/or audible alarm, or to enable a windshear guidance system as in copending application Ser. No. 834,729, Flight Guidance System for Aircraft in Windshear, invented by the present inventors and assigned to the assignee of the present invention.

Figure 4:
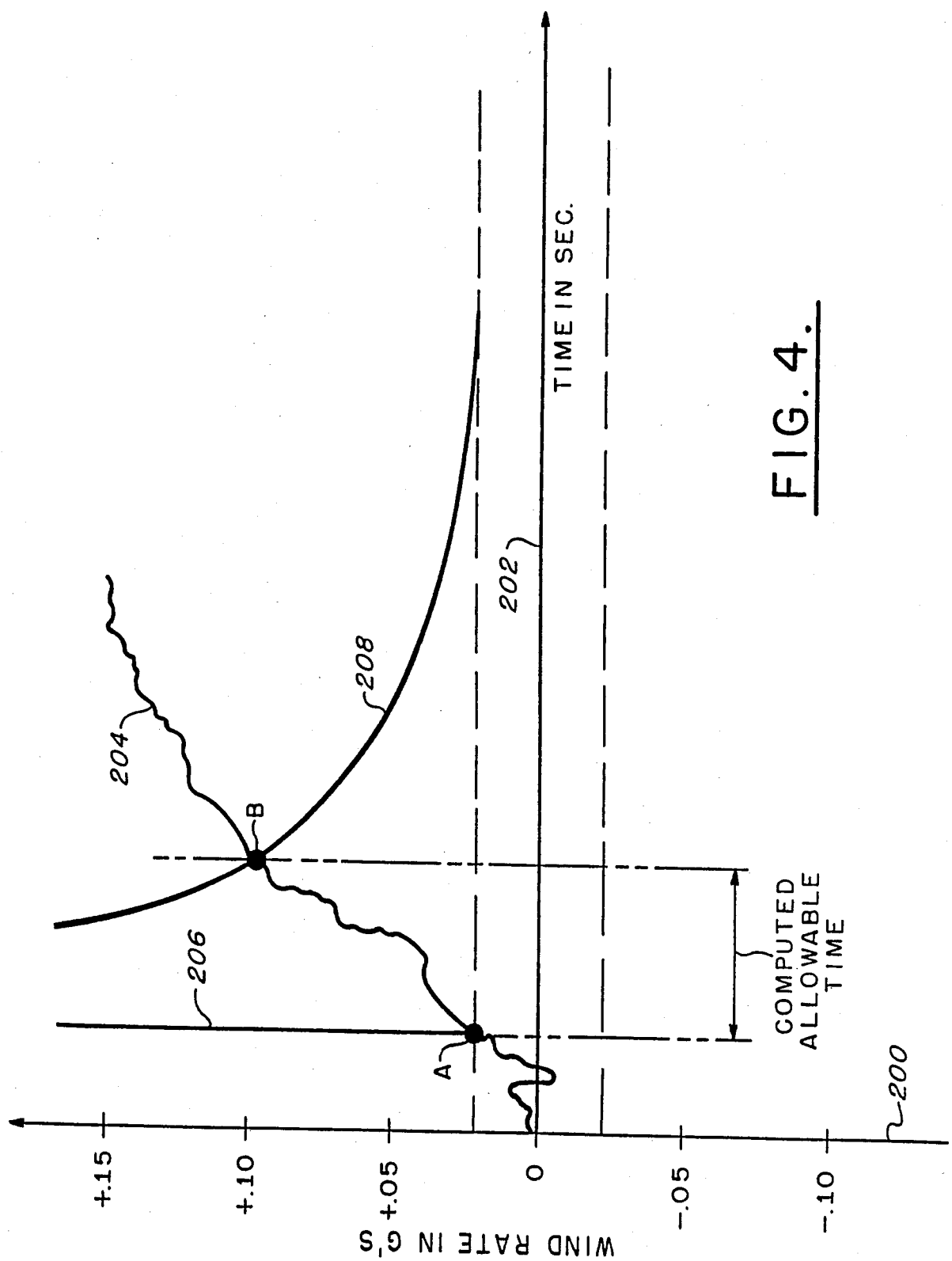
FIG. 4 is a timing diagram illustrative of the operation of the present invention.

FIG. 4 is illustrative of the operation of the detection system of FIG. 3. Wind rate magnitude in gravitational units (g's) is presented as the ordinate 200 and duration in seconds along the abscissa 202. Line 208 is representative of the parabolic equation (18) for $t_T$, the computed time to stick shaker speed. The erratic line 204 is typical of the entry to a windshear downburst, as represented by FIG. 1. Vertical line 206 illustrates a windshear condition where the minimum threshold of wind rate (for example, 0.02 g) applied to level detector 44 is exceeded. As the wind rate 204 continues at a value exceeding the threshold detection setting, elapsed time applied to summing junction 48 increases. The continuously computed time 208 which is a function of the magnitude of the wind rate derived from divider 40 and a $\Delta P/W$ ratio appropriate for the aircraft engaging the windshear is compared with the actual elapsed time in summing junction 48. When the elapsed time exceeds the computed time, as represented by point B, polarity detector 50 will indicate the presence of a windshear disturbance.

It will be appreciated that FIG. 4 demonstrates the following characteristics of the detection system:

(1) The annunciation of a wind disturbance is dependent on both the magnitude and duration of the wind rate.

(2) For large wind rates, the allowable time before annunciation is fairly short; conversely, for small wind rates above the threshold level, annunciation does not occur for a much longer time.

(3) Wind rates that are above the threshold level for elapsed times less than the computed allowable time will not result in an annunciation.

(4) Very high magnitude wind rates such as can be caused by atmospheric turbulence that do not exist for long periods of time do not cause false annunciations where they do not exceed the computed allowable time.

It is possible therefore to set a minimum threshold of wind rate magnitude at which it is desired to initiate a windshear warning and therefore minimize false alarms due to transient wind conditions. By incrementing a timer when the threshold is exceeded, and zeroing the timer when the magnitude of wind rate is less than the threshold, the measured time value can be compared with the allowable time as computed by the value of equation (18). The windshear annunciation signal is triggered when the measured time equals or exceeds the calculated allowable time, thus providing a detection signal that is responsive to both the magnitude and duration of the windshear condition, and hence responsive in real time.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. Vertical windshear detection apparatus for aircraft comprising:
   (a) means for providing a signal representative of true airspeed,
   (b) means for providing a signal representative of pitch angle of the aircraft,
   (c) means for providing a signal representative of angle of attack of the aircraft,
   (d) means for providing a signal representative of vertical acceleration of the aircraft,
   (e) means for combining said pitch angle signal and said angle of attack signal to provide a signal representative of flight path angle,
   (f) means for deriving a signal representative of the rate of change of airspeed from said true airspeed signal,
   (g) means for deriving a signal representative of pitch angle rate from said pitch angle signal,
   (h) means for deriving a signal representative of angle of attack rate from said angle of attack signal,
   (i) means responsive to said airspeed rate signal and said fligh path angle rate signal for deriving a product signal thereof,
   (j) means responsive to said pitch angle rate signal and said angle of attack rate signal for deriving a signal representative of the rate of change of flight path angle,
   (k) means responsive to said true airspeed signal and said rate of change of flight path angle signal for deriving a further product signal,
   (l) means responsive to said above mentioned product signals for providing a further combined signal representative of vertical acceleration relative to an air mass proximate to said aircraft, (m) means for algebraically combining said further combined signal and said vertical acceleration signal to provide a signal representative of a vertical component of said windshear, (n) means responsive to said signal representative of a vertical component of windshear for providing a first timing signal representative of an actual duration thereof, (o) means for providing a signal representative of a predetermined value of an aircraft parameter corresponding to a power to weight ratio, (p) means responsive to said aircraft parameter signal and said vertical component of windshear signal for generating a second timing signal representative of a quotient thereof having a value corresponding to a computed duration, and (q) means for algebraically combining said second timing signal and said timing signal to generate an algebraic difference signal indicative of the detection of a vertical windshear condition when said difference signal is equal to or greater than a value of zero.

2. The apparatus of claim 1, further comprising detection means responsive to the magnitude and polarity of said algebraic difference signal for generating a windshear annunciation signal when said first timing signal has a value at least equal to said second timing signal.

3. The apparatus of claim 1, wherein said means for deriving a signal representative of the rate of change of airspeed comprises an air data computer for providing a signal in accordance with the true airspeed and means for differentiating the output signal from said computer.

4. The apparatus of claim 1, wherein said means for providing a signal representative of angle of attack comprises sensor means for providing a signal in accordance with the angle of attack of the aircraft and means for differentiating said angle of attack signal.

5. The apparatus of claim 4, wherein said means for deriving a signal representative of the rate of change of flight path angle comprises:
  (a) vertical gyro means for providing said signal in accordance with pitch angle,
  (b) means for differentiating said pitch angle signal, and
  (c) means for combining said differentiated pitch angle and said differentiated angle of attack signals.

6. The apparatus of claim 1, wherein said means for providing a signal representative of the vertical acceleration of the aircraft comprises a vertical accelerometer.

7. The apparatus of claim 1, wherein said means for providing a further combined output signal representative of vertical acceleration further comprises:
  (a) means for algebraically subtracting said signal representing angle of attack of the aircraft from said signal representing pitch angle of the aircraft to provide a difference signal thereof,
  (b) first multiplier means responsive to said difference signal and said rate of change of airspeed signal for deriving said first mentioned product signal,
  (c) second multiplier means responsive to said signal representative of rate change of flight path angle and said true airspeed signal for providing said further product signal, and
  (d) means responsive to said first mentioned product signal and said further product signal for providing an algebraic sum thereof corresponding to said signal representing vertical acceleration relative to an air mass.

8. The apparatus of claim 2, wherein said means for generating a windshear annunciation signal further comprises:
  (a) means responsive to said signal representative of a vertical component of windshear for providing a signal having a first logic condition when a predetermined magnitude of said representative signal is exceeded, and a second logic condition when said magnitude is not exceeded,
  (b) means responsive to said logic signals indicative of time interval corresponding to a change in state between said second and first logic conditions, and
  (c) means coupled to receive said value of an aircraft parameter signal and said vertical component of windshear signal for generating said second timing signal corresponding to the ratio thereof indicative of the amount of time a vertical wind rate can be sustained in the presence of a windshear condition.

9. A windshear disturbance detection circuit, comprising:
  (a) means for providing signals representative of airspeed, airspeed rate, flight path angle, and flight path angle rate,
  (b) means for providing an algebraic sum of the product of said airspeed rate and flight path angle and the product of said airspeed and flight path angle rate,
  (c) means for providing a signal representative of vertical acceleration with respect to the ground,
  (d) means for providing an algebraic difference of said vertical acceleration signal and said algebraic sum, said difference providing a signal corresponding to a vertical rate of windshear disturbance,
  (e) level detector means responsive to said rate signal for providing an output signal when said rate signal exceeds a predetermined threshold,
  (f) timer means responsive to said output signal for providing a signal indicative of a duration thereof,
  (g) means for providing a signal representative of a change in an aircraft performance parameter proportional to a power-to-weight ratio of said aircraft,
  (h) divider means responsive to said rate component and said parameter signal for providing a quotient signal thereof,
  (i) means responsive to said quotient signal for providing a signal indicative of the absolute magnitude thereof,
  (j) means for combining said signal indicative of a duration and said signal indicative of an absolute magnitude of said quotient for providing an algebraic difference thereof, and
  (k) means responsive to said algebraic difference of said duration and absolute magnitude signals for providing a signal indicative of the polarity thereof, thereby to indicate the presence of a windshear condition.

10. The apparatus as set forth in claim 9, further comprising means responsive to said polarity signal for energizing an indicator denoting the presence of a windshear condition when said signal is of a predetermined polarity.

* * * * *